Nov. 10, 1925. 1,561,253
A. LAZZARI
DIRECTION INDICATOR
Filed Oct. 15, 1921 3 Sheets-Sheet 1

Inventor
Alberto Lazzari,
By
Attorney

Nov. 10, 1925.  
A. LAZZARI  
1,561,253

DIRECTION INDICATOR

Filed Oct. 15, 1921   3 Sheets-Sheet 2

Inventor
Alberto Lazzari,
By
Attorney

Nov. 10, 1925.
A. LAZZARI
1,561,253
DIRECTION INDICATOR
Filed Oct. 15, 1921   3 Sheets-Sheet 3
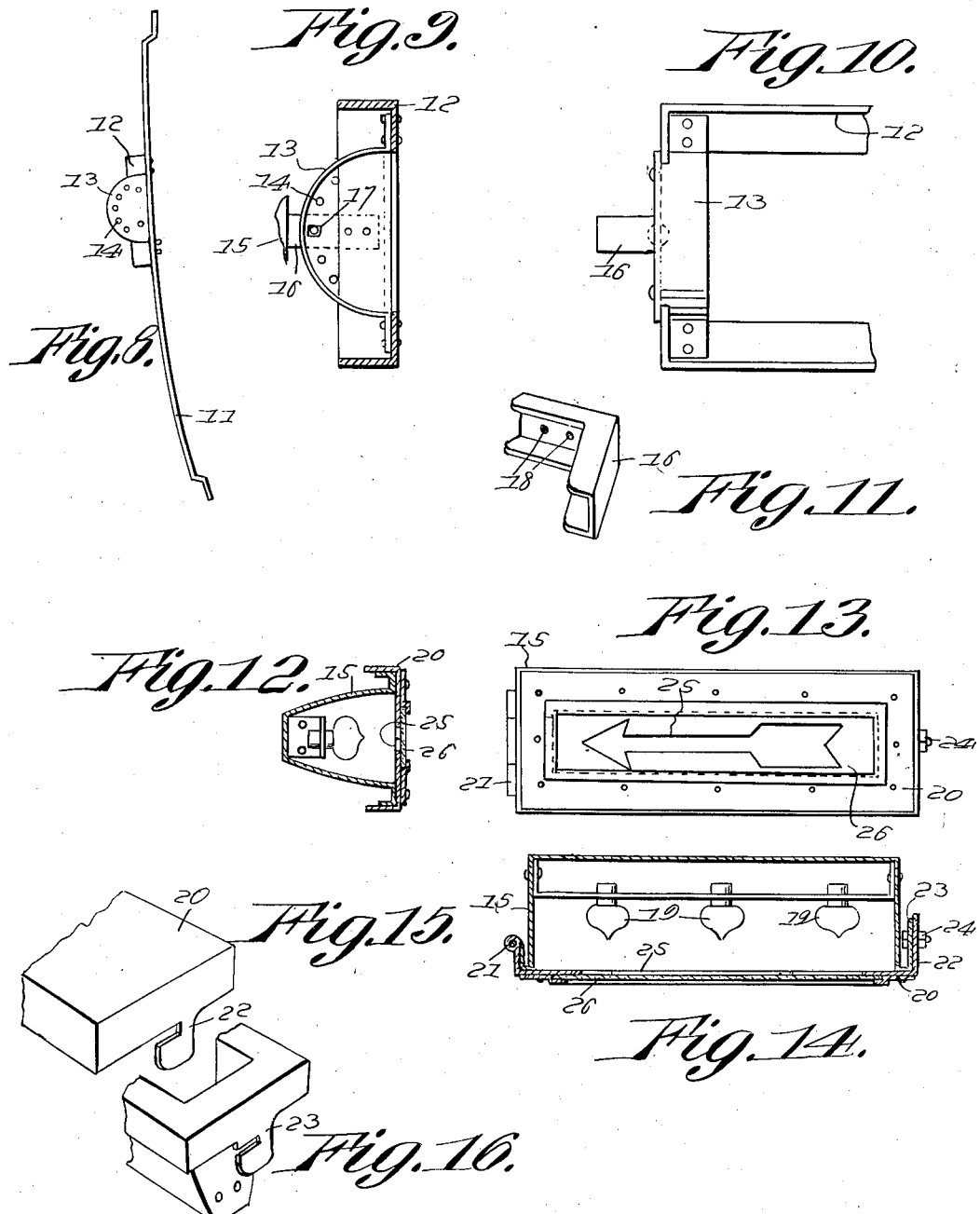

Patented Nov. 10, 1925.

1,561,253

UNITED STATES PATENT OFFICE.

ALBERTO LAZZARI, OF NEW YORK, N. Y.

DIRECTION INDICATOR.

Application filed October 15, 1921. Serial No. 507,905.

*To all whom it may concern:*

Be it known that ALBERTO LAZZARI, a citizen of the United States of America, residing at New York, in the county of New York and State of New York, has invented new and useful Improvements in Direction Indicators, of which the following is a specification.

The object of the invention is to provide a relatively simple and efficient signalling means for use in connection with automobiles and similar vehicles whereby the intentions of the driver of a car equipped therewith in the matter of changing the direction of forward progress or of stopping or reducing the speed of progress may be indicated to the driver of a following vehicle under such conditions as to avoid the danger of rear-end collisions and the like; and with this object in view the invention consists in a construction and combination of parts of which a preferred embodiment is shown in the accompanying drawings, wherein:—

Figure 8 is a detail side view of one of the standards of the rear end attaching frame.

Figure 9 is an enlarged detail view of one of the lamp box brackets.

Figure 10 is a rear view of the same.

Figure 11 is a detail view in perspective of an angular brace used in connection with the bracket.

Figure 12 is a cross sectional view of the lamp box.

Figure 13 is a rear elevation of the lamp box.

Figure 14 is a horizontal sectional view of the same.

Figures 15 and 16 are detail views in perspective of the adjacent ends of the lamp box to show the means for securing the same in closed relation.

Figure 1:
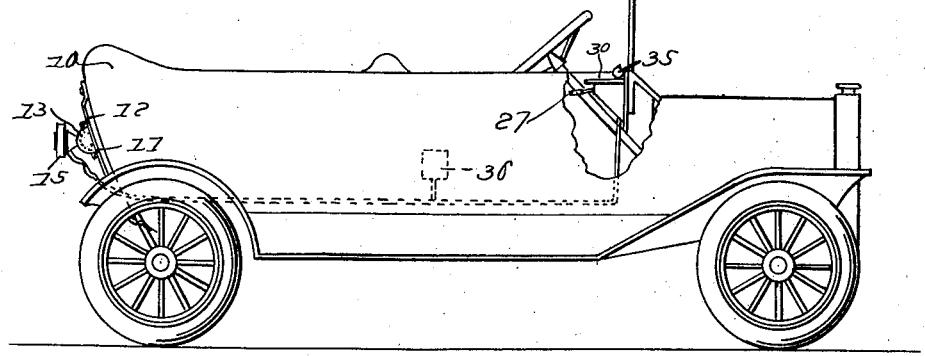
Figure 1 is a side view partly broken away of a vehicle equipped with a signalling mechanism embodying the invention.
Figure 2:
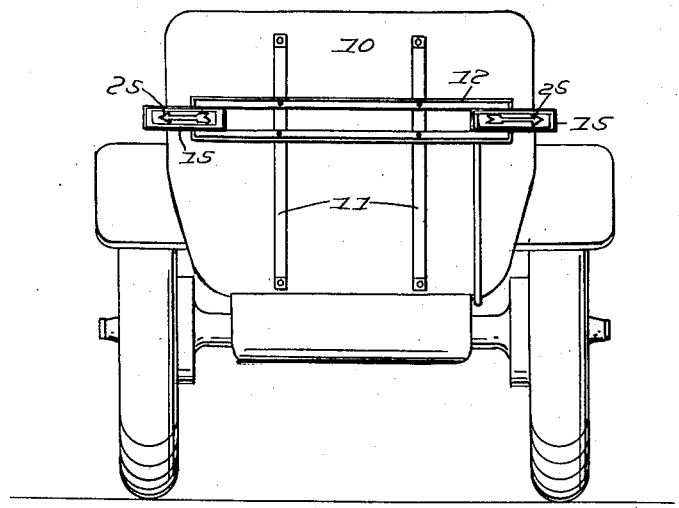
Figure 2 is a rear view of the same.
Figure 3:
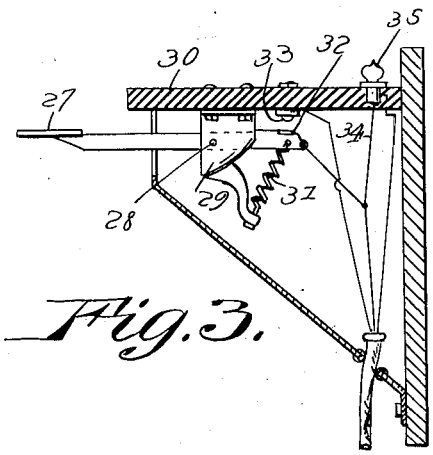
Figure 3 is a detail sectional view of the signal operating keys and the mounting for the same within convenient reach of the driver.
Figure 4:
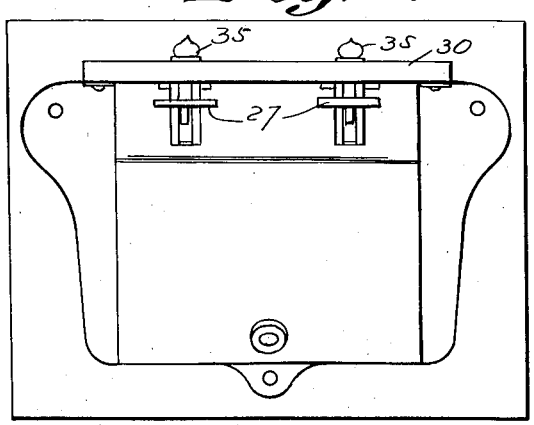
Figure 4 is a rear elevation of the keys and mounting.
Figure 5:
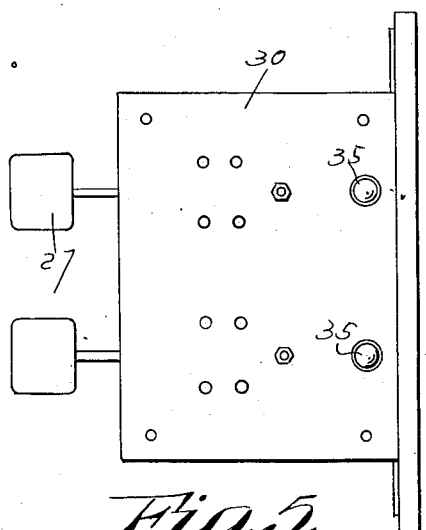
Figure 5 is a plan view of the same.
Figure 6:
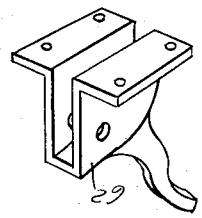
Figure 6 is a detail view of one of the key supporting brackets.

The signalling device proper is supported on the rear end of the car body which is indicated in the drawings at 10 by means of upright bars 11 connected by a transverse frame 12 consisting of spaced angle bars which are connected near their extremities by segmental brackets 13 provided with slots 14, and the lamp boxes 15 which are constructed as indicated in detail in Figures 12, 13 and 14 are mounted upon said brackets through the medium of angle bars 16 held in place by bolts 17 which extend through the slots 14 and slots 18 in said angle bars to the end that the lamp boxes may be adjusted angularly on the supporting frame to occupy a substantially horizontal position or a horizontally facing position regardless of the inclination or under cutting of the rear side of the vehicle body. The apparatus is thus adapted for application to a variety of different forms and makes of cars.

The lamp boxes of which one is arranged at each end of the supporting frame adjacent to each side of the car body, contains a plurality of lighting units such as the lamps 19 and is provided with a cover 20 preferably hinged as at 21 and having a slotted ear 22 at its free end for registration with a corresponding ear 23 on the box proper for the reception of a locking bolt 24 to secure the same in its closed position. This lamp box cover bears the signalling symbol which in the construction illustrated is represented as an arrow 25 protected by a glass or other light penetrable medium 26 and visible only when the lighting units are in use. The closing of the circuit through the lamps in one signal box thus will indicate the intention of the driver to turn to the left while the lighting of the units in the other box will indicate an intention to turn to the right while the illumination of both signals will indicate an intention to stop or reduce the progress and thus serve as a warning to the driver of a following car to avoid attempting to pass the car ahead.

Figure 7:
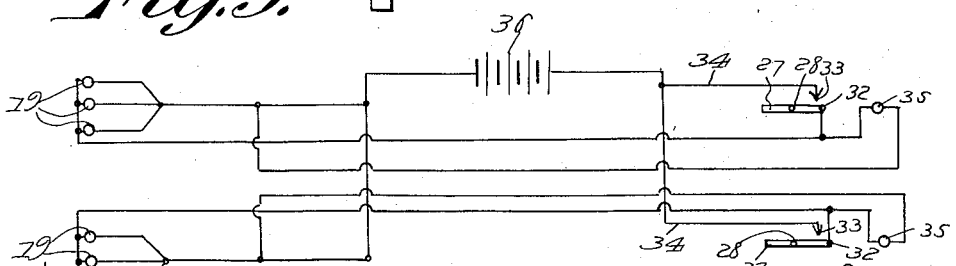
Figure 7 is a diagrammatic view of the signal wiring.

The means for actuating or selectively illuminating the signal boxes consists in the construction illustrated of keys 27 pivotally mounted as at 28 in suitable supports 29 depending from a bracket 30 which may be supported on the dashboard of the vehicle within convenient reach of the driver, said keys being yieldingly held by springs 31 in their normal positions and carrying contacts 32 for engagement with stationary contacts 33 to respectively close the circuits through the conductors 34 with the lamps in the respective lamp boxes. An indicator or check lamp 35 is preferably arranged in each circuit controlled respectively by the keys, so that when a key is operated the lighting of the corresponding check lamp 35 serves as a means of showing that the signal is properly operating at the rear of the car. Any suitable source of energy such as the battery indicated at 36 may be employed in the signalling circuit of which a diagram is indicated in Figure 7 and which indicates the relative arrangement of the keys and check lamps, and the arrangement of the keys preferably is such as to permit of the simultaneous depression thereof to close both signalling circuits when as hereinbefore indicated it is desired by the illumination of both signal boxes to indicate the intention of the driver to check his speed of forward movement or stop the car.

Having described the invention, what is claimed as new and useful is:—

1. A device for the purpose indicated comprising a transverse frame having uprights terminally attachable to a vehicle body on the rear end, signal boxes carried at the remote ends of the frame, and brackets on the frame for supporting said boxes and angularly adjustable to horizontally position said boxes.

2. A device for the purpose indicated comprising a transverse frame, signal boxes carried at the remote ends of said frame, uprights supporting the frame and terminally attachable at their extremities to the rear end of a vehicle body, segmental brackets carried by the frame, angle bars pivotally secured to said segmental brackets, the latter being provided with spaced slots concentrically arranged with respect to said pivot points, and bolts passing through said angle bars and selectively engageable in said brackets for horizontally positioning the boxes irrespective of the angle of inclination of the vehicle body.

In testimony whereof he affixes his signature.

ALBERTO LAZZARI.